UNITED STATES PATENT OFFICE.

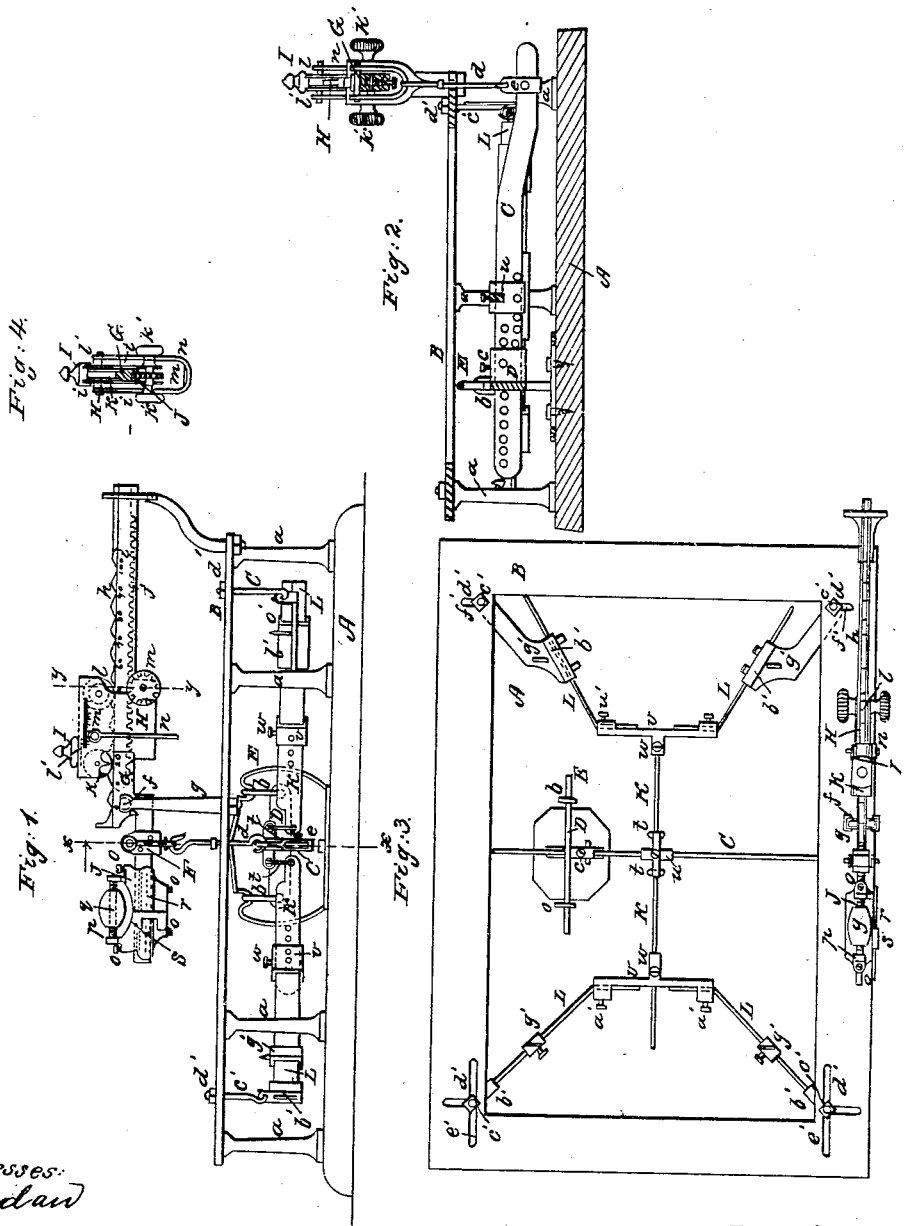

O. W. JIPSON, OF ROCHESTER, NEW YORK.

WEIGHING-SCALE.

Specification of Letters Patent No. 22,810, dated February 1, 1859.

*To all whom it may concern:*

Be it known that I, O. W. JIPSON, of Rochester, in the county of Monroe and State of New York, have invented certain new and useful Improvements in Weighing-Scales; and I do hereby declare that the following is a full, clear, and exact description of the same, reference being had to the annexed drawings, making a part of this specification, in which—

Figure 1, is a side view of my invention. Fig. 2, a transverse section of same, taken in the line $x, x$, Fig. 1. Fig. 3, is a plan or top view of ditto. Fig. 4, a transverse section of a portion of ditto, taken in the line $y, y$, Fig. 1.

Similar letters of reference indicate corresponding parts in the several figures.

This invention relates 1st, to a novel application of weights to the scale beam, as hereinafter fully shown and described, whereby the weights may be adjusted or moved with facility, articles weighed in a very exact manner, and the tare also weighed.

The invention relates, 2nd, to an adjustable sleeve placed on the scale beam for the purpose of rendering the connection of the beam to the platform adjustable, to compensate for the adjustment of the platform frame.

The invention relates, 3rd, to a novel construction of the platform frame, whereby the same may be readily increased or diminished in size, according to the desired size or area of the platform, and the lever, also, which is attached to said frame rendered capable of being lengthened or shortened, as may be required.

To enable those skilled in the art to fully understand and construct my invention, I will proceed to describe it.

A, represents a bed on which uprights $a$, are placed, said uprights supporting a rectangular frame B.

C, is a lever which may be formed of a flat metal bar, one end of which is fitted in or passes through a socket D, of T-shape, and which is suspended freely by links $b$, or in any other proper manner, from a curved support E, attached to the bed A. The lever C, is secured in the socket D, or prevented from casually sliding therein, by means of a set screw $c$, shown in Figs. 2 and 3. The opposite end of the lever C, is attached by a link $d$, to an adjustable sleeve F, on the scale beam G, and the lower end, also, of the link $d$, is connected to the lever C, by an adjustable sleeve $e$. The beam G, has its fulcrum at $f$, at the upper part of a support $g$, attached to the frame B, at one side. The beam G, at one side of its fulcrum has a notched upper edge, as shown at $h$, in Figs. 1 and 3, and at each side of the beam G, there is a longitudinal ledge $i$, just at the bases of the notches. The under side of the beam G, below the notched portion has a rack $j$, formed within it, see Fig. 4, and dotted lines, Fig. 1

On the notched portion of the beam G, a metal block H, is placed. In the upper part of this block, two rollers $k, l$, are placed. The roller $k$, works over the notched surface of the beam but the roller $l$, has a grooved periphery and its edges bear on the ledges $i, i$, at the sides of the beam, as shown clearly in Fig. 4. In the lower part of the block H, a pinion $m$, is placed, said pinion gearing into the rack $g$, and having a knob $k^1$, at each end of its axis. On the upper part of the block H, a slide I, is placed. This slide has a pointer $l^1$, at each side, said pointers projecting down over the sides of the block H, and above scales $m^1$, stamped or engraved at each side of the block. To the block H, a clevis $n$, is attached.

On the beam G, at the opposite side of the fulcrum $f$, a metal block J, is placed. This block is placed loosely on the beam, or the recess of the block through which the beam passes is made sufficiently large to allow the block to be adjusted both vertically and longitudinally on the beam, said block being secured in the desired position by set screws $o$. On the upper part of the block J, a horizontal screw $p$, is secured, on which a nut or counterpoise $q$, is placed, and to one side of the block J, a graduated plate $r$, is attached, said plate being notched at its upper edge and having a slide $s$, fitted thereon.

The lever C, has two arms K, K, attached to it by links $t, t$, said links being suspended from an adjustable sleeve $u$, on said lever. The outer ends of the arms K, K, pass through sockets $v, v$, in which they may be secured at any desired point by set screws $w, w$.

L, L, are diagonal bars the inner ends of which are fitted in the sockets $v, v$, and secured therein by set screws $a^1 a^1$. The outer ends of the bars L, L, are fitted in sockets $b^1, b^1$, which are suspended by links $c^1$, to the frame B. On the upper ends of the links $c^1$, nuts $d^1$, are placed, said nuts being above the frame B. and the links $c^1$, at one end of the frame B, passing through T-shaped slots $e^1$, in the frame, the slots $f^1$, that receive the links at the opposite end of the frame B, being straight and having a transverse position relatively with the frame B. The platform rests on knife-edged bearings $g^1$. The platform, being of ordinary construction, is not shown.

From the above description it will be seen that by turning the knobs $k^1$, the block H, may be moved with facility, and the roller $k$, made to fit in either notch $h$, on the beam G, the roller $l$, working or moving on smooth surfaces, $i, i$. In light beams, and consequently small scales, the block H, may be moved directly by hand, but in large scales and corresponding-sized beams, the racks $j$, and pinion $m$, will prove a valuable aid. The block H, is of course, a weight, and the notches form a scale in which the roller $k$, fits and designates the weight of the article on the platform when the latter is counterpoised. The slide I, designates the fractional parts of the units of the beam G, the pointers $l$, indicating the same on the scales $m$. By means of the slide $s$, on the graduated plate $r^1$, the tare may be weighed, and by adjusting the block J, on the beam and the nut $q$, for the purpose of counterpoising and balancing the beam, the nut $q$, admitting of a very nice adjustment to obtain a perfect balance.

It will be seen that the lever C, may be so adjusted as to extend out from the device a greater or less distance, as desired, and it will also be seen that the bars K, K, L, L, admit of being adjusted longitudinally, as they are fitted loosely in their respective sockets $u, d, v, v, b^1, b^1$, and the links $c^1$, also allowed to be adjusted in the frame B. These bars, therefore, which form the frame of the platform may be expanded and contracted to suit different sized platforms, and as the sleeve F, may be adjusted on the beam G, it follows as a matter of course that the beam and platform may be counterpoised at any adjustment of the platform frame, or lever C.

I do not claim separately any of the parts herein shown and described, but—

Having thus described my invention, what I claim as new and desire to secure by Letters Patent, is—

1. The sliding block H, when provided with the rollers $k, l$, and slide or supplemental weight I, arranged and combined as shown, for the purpose specified, and with or without the rack $j$, and pinion $m$.

2. The adjustable block J, provided with the slide or weight $s$, graduated bar $r$, in combination with the nut or supplementary weight $q$, as and for the purpose set forth.

3. The attachment of the lever C, to the platform frame, as shown, whereby the same may be adjusted farther in or out from the frame, as circumstances may require.

4. The arrangement of the bars L, L, L, L, K, K, with their sockets $v, v, b^1, b^1$, and with the frame B, substantially as shown; to admit of the adjustment of the bars to receive platforms of greater or less size, as required.

5. The employment or use of the sleeve F, attached or applied to the beam G, as and for the purpose specified.

O. W. JIPSON.

Witnesses.
C. JORDAN,
E. JORDAN.